United States Patent
Raffaelli

(10) Patent No.: US 10,829,177 B2
(45) Date of Patent: Nov. 10, 2020

(54) ROLLING MOTOR VEHICLE

(71) Applicant: PIAGGIO & C. S.P.A., Pontedera (IT)

(72) Inventor: Andrea Raffaelli, Pontedera (IT)

(73) Assignee: PIAGGIO & C. SPA, Pontedera (Pisa) (IT)

( * ) Notice: Subject to any disclaimer, the term of this patent is extended or adjusted under 35 U.S.C. 154(b) by 125 days.

(21) Appl. No.: 16/065,241

(22) PCT Filed: Dec. 28, 2016

(86) PCT No.: PCT/IB2016/058046
§ 371 (c)(1),
(2) Date: Jun. 22, 2018

(87) PCT Pub. No.: WO2017/115295
PCT Pub. Date: Jul. 6, 2017

(65) Prior Publication Data
US 2019/0344855 A1   Nov. 14, 2019

(30) Foreign Application Priority Data

Dec. 28, 2015   (IT) .......................... 102015000088094

(51) Int. Cl.
*B62K 5/10*   (2013.01)
*B62K 5/08*   (2006.01)
(Continued)

(52) U.S. Cl.
CPC .............. *B62K 5/10* (2013.01); *B60G 21/007* (2013.01); *B60G 21/05* (2013.01); *B62D 9/02* (2013.01);
(Continued)

(58) Field of Classification Search
CPC ... B62K 5/01; B62K 5/10; B62K 5/08; B62K 5/027; B62K 5/00; B62K 5/05;
(Continued)

(56) References Cited

U.S. PATENT DOCUMENTS 9,845,111 B2 *   12/2017   Takano ..................... B62K 5/05
10,086,900 B2 *   10/2018   Hara ......................... B62K 5/05
(Continued)

FOREIGN PATENT DOCUMENTS

CN   1654262 A   5/2005
CN   1980804 A   6/2007
(Continued)

OTHER PUBLICATIONS

International Search Report and Written Opinion for PCT/IB2016/058046, dated Apr. 18, 2017.
(Continued)

*Primary Examiner* — Keith J Frisby
(74) *Attorney, Agent, or Firm* — Cantor Colburn LLP

(57) ABSTRACT

A rolling motor vehicle (4) comprising a forecarriage frame (16), at least one pair of front wheels (10"), a rolling kinematic mechanism (20) to which each wheel (10") is connected by means of a respective axle journal (60), a roll control system (100) comprising a rod (110) which connects the two front wheels (10") directly to each other at the respective axle journals (60), the roll movements of the two front wheels (10") and of the respective axle journals (60) causing changes in the lying position of said rod (110) with respect to a vertical projection plane which is transverse to a centre line plane of the motor vehicle (4), the rod (110) is usable directly or indirectly by the driver (P) as a command element to control the rolling movements of the two front wheels (10") without having to put his feet on the ground.

28 Claims, 10 Drawing Sheets

(51) Int. Cl.
*B62K 5/027* (2013.01)
*B62D 9/02* (2006.01)
*B62D 9/04* (2006.01)
*B60G 21/05* (2006.01)
*B60G 21/00* (2006.01)
*B62K 5/00* (2013.01)

(52) U.S. Cl.
CPC ............... *B62K 5/027* (2013.01); *B62K 5/08* (2013.01); *B60G 2300/122* (2013.01); *B60G 2300/45* (2013.01); *B60G 2800/012* (2013.01); *B62D 9/04* (2013.01); *B62K 2005/001* (2013.01)

(58) Field of Classification Search
CPC ...... B62K 2005/001; B62D 9/02; B62D 9/04; B60G 21/05; B60G 21/007; B60G 2300/45; B60G 2300/122; B60G 2800/012; B60Y 2200/122; B60Y 2200/12
USPC ............ 280/124.103, 5.509, 62; 180/210, 41
See application file for complete search history.

(56) References Cited

U.S. PATENT DOCUMENTS

| | | | |
|---|---|---|---|
| 2005/0012291 | A1 | 1/2005 | Bagnoli |
| 2005/0167174 | A1* | 8/2005 | Marcacci .......... B60G 17/0152 180/76 |
| 2008/0238005 | A1* | 10/2008 | James ..................... B62D 9/02 280/5.509 |
| 2010/0044977 | A1* | 2/2010 | Hughes ................ B60G 21/007 280/5.509 |
| 2015/0239522 | A1* | 8/2015 | Iizuka .................... B62K 5/027 280/267 |
| 2015/0246704 | A1* | 9/2015 | Takano ................ B60G 17/005 280/269 |
| 2017/0106930 | A1* | 4/2017 | Hara ..................... B62K 5/027 |

FOREIGN PATENT DOCUMENTS

| | | |
|---|---|---|
| CN | 101172501 A | 5/2008 |
| CN | 103158484 A | 6/2013 |
| CN | 104487321 A | 4/2015 |
| CN | 104487326 A | 4/2015 |
| EP | 2889210 A1 | 7/2015 |
| EP | 2899107 A1 | 7/2015 |
| EP | 2913255 A1 | 9/2015 |
| TW | I410339 B | 10/2013 |
| TW | 201420410 A | 6/2014 |

OTHER PUBLICATIONS

CN Search Report dated Jul. 8, 2019 re: Application No. 2016800765763, pp. 1-2, citing: CN 104487326 A, CN 103158484 A, CN 1980804 A, CN 1654262 A, CN 104487321 A, CN 101172501 A and US 2005012291 A1.

TW Search Report dated Jan. 15, 2020 re: Application No. 105143309, pp. 1, citing: TW 201420410 A and TW I410339.

* cited by examiner

ROLLING MOTOR VEHICLE

CROSS-REFERENCE TO RELATED APPLICATION

This application is the 35 U.S.C. § 371 national stage application of PCT Application No. PCT/IB2016/058046, filed Dec. 28, 2016, where the PCT claims the priority to and benefit of Italian Patent Application No. 102015000088094, filed Dec. 28, 2015, both of which are herein incorporated by reference in their entireties.

FIELD OF APPLICATION

This invention relates to a rolling motor vehicle with roll control.

In particular, the motor vehicle according to the invention can be a motor vehicle equipped with two front steering and rolling wheels in the front and one fixed-axle drive wheel in the rear.

STATE OF THE ART

In the field of motor vehicles, there is an increasingly growing offering of "hybrid" vehicles that combine the characteristics of motorcycles, in terms of manageability, with the stability of four-wheeled vehicles.

These models are represented, for example, by three-wheeled motor vehicles equipped with two steering front wheels and by four-wheeled vehicles known as QUADS.

More in detail, the three-wheeled motor vehicles mentioned above are equipped with two steering and rolling (i.e., tiltable or inclinable) wheels and one fixed-axle drive wheel in the rear. The rear wheel has the purpose of providing drive torque and therefore allowing traction, while the front wheels, paired, have the purpose of providing the directionality of the vehicle. In addition to steering, the paired wheels in the forecarriage can also incline and roll. Thanks to this solution, compared to motor vehicles with three wheels, two of which at the rear, motor vehicles with two wheels at the forecarriage are equivalent to a real motorcycle since, just like a motorcycle, the motor vehicle is able to incline in a curve. However, compared to a motor vehicle with only two wheels, such vehicles with two wheels paired at the forecarriage have greater stability provided by the double support of the front wheels on the ground, similar to that provided by a car.

The front wheels are kinematically connected to each other by means of kinematic mechanisms that ensure the front wheels rolling in a synchronous and specular manner, for example through the interposition of articulated quadrilaterals. Such motor vehicles are also provided with two independent suspensions, one for each of the two front wheels, equipped with shock absorbers, which are also independent.

Three-wheeled rolling motor vehicles are therefore intended to provide the user the maneuverability of a two-wheeled motorcycle and, at the same time, the stability and safety of a four-wheeled motor vehicle.

A three-wheeled rolling motor vehicle of this type is described, for example, in Italian patent application No. IT2003MIA001108 on behalf of the same applicant.

Due to the structural particularity of this type of motor vehicle, it is possible that in particular travel conditions, for example, at very low speeds or during pauses or stops the motor vehicle may fall as a result of an uncontrolled and/or accidental rolling movement.

This drawback has been addressed by equipping the aforesaid vehicles with roll block systems, manually actuatable by the user and/or by an automatic control system.

An anti-roll system for such motor vehicles is described, for example, in Italian patent application No. IT2004MIA000171 on behalf of the same applicant. The anti-roll system is described in relation to a rolling motor vehicle equipped with a steering system with articulated quadrilateral structure and two independent front suspensions. The roll block system comprises: a mechanical calliper suitable to block the movements of the articulated quadrilateral so as to prevent the rolling it allows; two hydraulic clamps actuated simultaneously by means of an electric motor acting on rods placed in parallel to the shock absorbers so as to prevent rolling due to an asymmetrical spring suspension motion of the two wheels.

A first disadvantage of the blocking system described above is its complexity. In fact, it requires three separate blocking devices: one acting on the articulated quadrilateral; two on the shock absorbers.

This system also has the disadvantage of making the motor vehicle rigid not only in rolling movements due to the quadrilateral and/or asymmetrical springing, but in pitching movements (symmetrical spring suspension motion).

The pitch block requires adequate sizing of the blocking devices of the shock absorbers, with increased production costs. In fact, in the case in which the motor vehicle suffers a shock from the road (e.g., from a hole) with rolling blocked, the blocking system must be able to overcome the impulsive peak of the impact force in order not to change the geometrical configuration of the suspension.

In some situations, the pitch block can also affect the behaviour of the vehicle, and thus its safety. For example, if a front wheel were subjected to an impact sufficient to overcome the force of the blocking device of the related shock absorber, the wheel would rise and the motor vehicle would find itself lowered on that side. In fact, when perturbation was finished, the blocking device would keep the motor vehicle in the new position, putting the motor vehicle in an unsafe configuration.

The parallel block of the shock absorbers also has consequences in case of braking. In fact, the motor vehicle is "blocked" in a balance situation different from that one which would be statically required, since the forecarriage is blocked in a lower position due to a load resulting from the sum of the static load and the dynamic transfer due to braking.

Other anti-roll systems intended for motor vehicles equipped with a steering system with articulated quadrilateral structure are described in European patent application EP2810861A1, in French patent FR2953184 and in European patent EP2345576B1. These anti-roll systems operate directly on the articulated quadrilateral structure and block rolling by blocking the movements of the articulated quadrilateral itself. These anti-roll systems are not, however, able to inhibit roll movements due to the asymmetric shaking permitted by the shock absorbers of the two front wheels. In addition, the anti-roll systems mentioned above, because specifically designed to operate on a steering system with articulated quadrilateral structure, are directly bound to the presence of such a structure and to its mechanical configuration.

In general, the currently known roll block devices are mechanically complex and therefore expensive to install. They also require an adequate control system to ensure the vehicle stability and driver safety in all conditions of use.

For the above reasons, the roll block systems currently known are not installed in rolling motor vehicles intended for low or lower-middle price ranges, as can be, in particular, motor vehicles intended for markets in developing countries.

In fact, for this type of markets, motor vehicles must be economical to produce, mechanically simple, robust, easy to maintain and substantially without electronics. The adoption of anti-roll systems of the known type would go in the opposite direction to those needs.

Even rolling motor vehicles intended for low or lower-middle price ranges have the problems explained above, related to unwanted rolling movements. So, there is the need to develop a rolling motor vehicle equipped with a roll control (and possibly block) system that ensures effectiveness of intervention by means of a purely manual control by the driver and at the same time is mechanically simple and inexpensive to produce.

PRESENTATION OF THE INVENTION

Therefore, the purpose of this invention is to eliminate, or at least reduce, the above-mentioned problems relating to the prior art, by providing a rolling motor vehicle equipped with a roll control system that ensures effectiveness of intervention in terms of roll control, and possibly also in terms of blocking the roll, by means of driver's direct mechanical command of purely "manual" type, and that is at the same time mechanically simple and inexpensive to produce.

A further purpose of this invention is to make available a rolling motor vehicle equipped with a roll control system that is usable by the driver in a completely manual manner according to a very simple and immediate logic of use.

A further purpose of this invention is to make available a rolling motor vehicle equipped with a roll control system that, when actuated, does not inhibit pitching of the motor vehicle due to a symmetrical compression of the shock absorbers.

A further purpose of this invention is to make available a rolling motor vehicle equipped with a roll control system that, when actuated, does not influence steering.

A further purpose of this invention is to make available a rolling motor vehicle equipped with a roll control system that is constructively simple and economical to produce and mount on the motor vehicle itself.

DESCRIPTION OF THE DRAWINGS

The technical characteristics of the invention can be clearly understood from the content of the claims listed below and its advantages will become more apparent from the detailed description that follows, made with reference to the accompanying drawings, which show one or more purely exemplary and non-limiting embodiments wherein:

DETAILED DESCRIPTION

Figure 1:
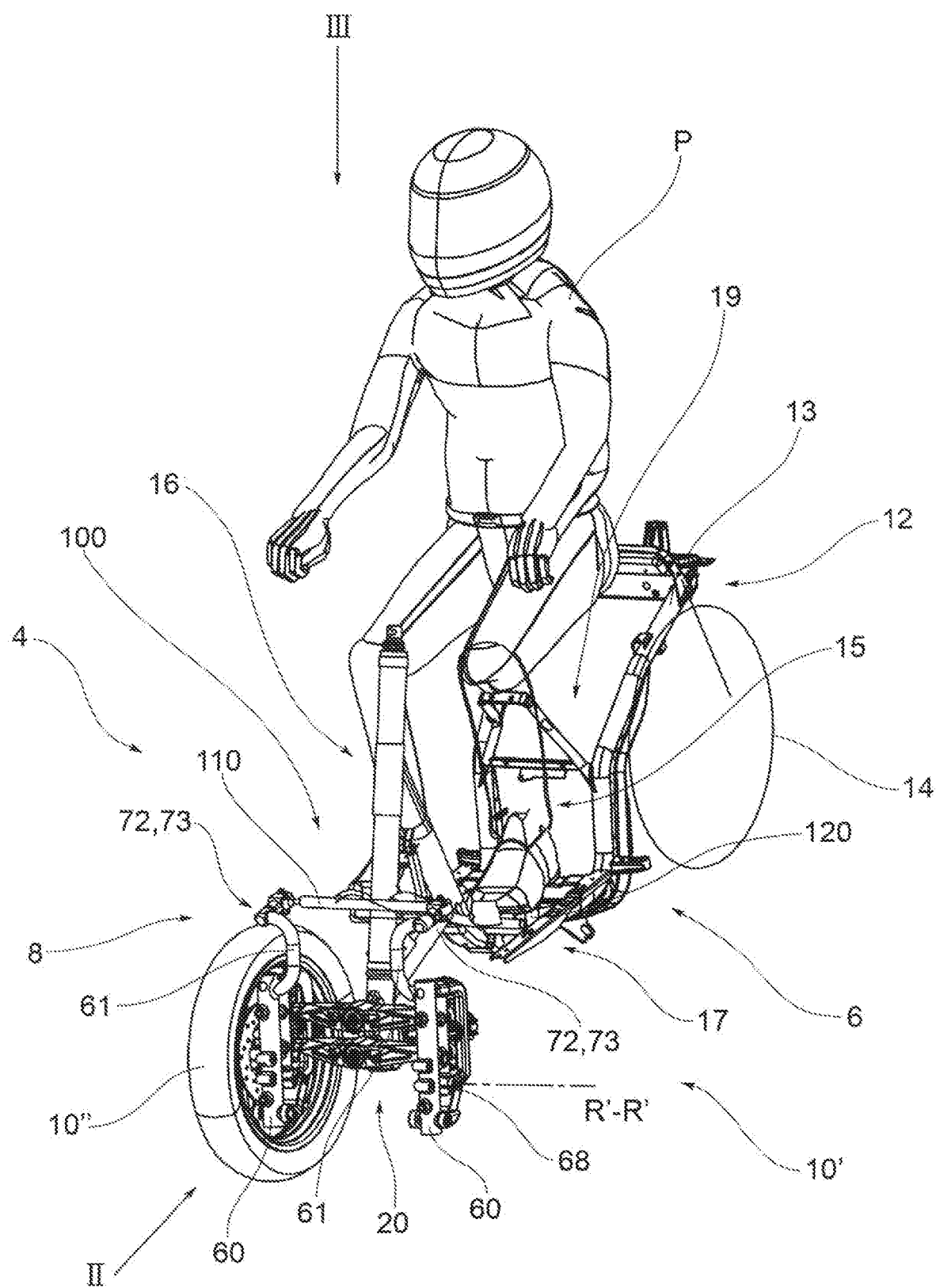
FIG. 1 is a partially schematised front perspective view of a motor vehicle equipped with a forecarriage with roll block system according to a first embodiment of the invention and provided with an articulated quadrilateral roll kinematic mechanism of the type that guides and supports the axle journals of the wheels by means of a kinematic connection system of the roto-translational type.

With reference to the above figures, the reference number 4 globally indicates a motor vehicle according to this invention.

For the purposes of this invention, it should be clarified that the term motor vehicle must be considered in broad sense, encompassing any motorcycle having at least three wheels, namely two front wheels, as better described below, and at least one rear wheel. So, the definition of motor vehicle also includes so-called quadricycles, having two wheels on the forecarriage and two wheels on the rear.

The motor vehicle 4 comprises a frame 6 that extends from a forecarriage 8, which supports at least two front wheels 10, to a rear end 12 that supports one or more rear wheels 14. It is possible to distinguish a left front wheel 10' and a right front wheel 10" in which the definition of left and right wheel 10',10" is purely conventional, and is understood with respect to a driver of the vehicle. Said wheels are arranged to the left and to the right of a centreline plane M-M of the motor vehicle, with respect to the observation point of a driver driving it.

As illustrated in the accompanying figures, the frame 6 defines an accommodating area 15 conformed to accommodate a driver P, which can in particular be delimited by a footrest footboard 17, a seat 19 and the front structure of the motor vehicle.

In the rest of the description, and also in the figures, reference will be made to elements of the forecarriage specular or symmetrical with respect to said centreline plane M-M, using the superscripts ' and " to indicate respectively the left and right components of the forecarriage, with respect to the observation point of a driver driving it.

For the purposes of this invention, the frame 6 of the motor vehicle 4 can have any shape and size and can be for example of the lattice, box, or cradle type, single or double, and so on. The frame 6 of the motor vehicle can be in one piece or in several parts; for example, the frame 6 of the motor vehicle is interconnected with a rear frame 13 which can comprise an oscillating rear fork (not shown) that supports one or more rear drive wheels 14. The aforesaid oscillating rear fork can be connected to the frame 6 by means of direct hinging, or by the interposition of levers and/or intermediate frames.

According to a general embodiment of this invention, the motor vehicle forecarriage 8 comprises a forecarriage frame 16 and a pair of front wheels 10',10" kinematically connected to each other and to the forecarriage frame 16 by means of a rolling kinematic mechanism 20 that provides them rolling in a synchronous and specular manner.

Each wheel 10',10" is connected to the said rolling kinematic mechanism 20 by means of a respective axle journal 60, which is mechanically connected to a rotation pin 68 of the wheel in such a way as to rotatably support it around a rotation axis R'-R', R"-R".

"Axle journal" of a wheel means the mechanical part of the motor vehicle intended to support the rotation pin of the wheel itself and to kinematically interconnect it to the suspensions, to the steering device and to the aforesaid rolling kinematic mechanism 20. The axle journal has no degrees of freedom with respect to the wheel pin and is therefore kinematically integral with the latter. The axle journal can be made in one piece with the wheel pin or be mechanically bound to it to form a single piece.

The forecarriage 8 of the motor vehicle also comprises:
a roll control system 100, and
suspension means 90 that provide each axle journal 60 at least one spring suspension motion with respect to said rolling kinematic mechanism 20.

The rolling kinematic mechanism 20 can have any configuration provided that it is functional to provide the front wheels rolling in a synchronous and specular manner. In particular, this rolling kinematic mechanism 20 can be a system configured as an articulated-parallelogram system, or a system of suspended longitudinal arms.

The forecarriage 8 is equipped with a steering device 36,86 suitable to command the rotation of the axle journals 60 around respective steering axes S'-S',S"-S" of each front wheel 10',10". In particular, the steering device can be constituted by a steering column 86 and a steering bar 36, associated to the steering column 86 and intended to transmit the steering command to the axle journals. The steering device can act directly on the axle journals 60 and be subject to the action of the suspensions or act indirectly on the axle journals without being subject to the action of the suspensions (as illustrated for example in the accompanying figures).

Preferably, as illustrated in the accompanying figures, the aforesaid rolling kinematic mechanism 20 is an articulated quadrilateral system.

More in detail, as illustrated in the examples of the accompanying figures, this articulated quadrilateral system comprises a pair of cross-members 24',24", hinged to the forecarriage frame 16 in correspondence of middle hinges 28. The cross-members 24',24" are connected to each other, in correspondence of opposite transverse ends 40, by means of uprights 48', 48" pivoted to said transverse ends 40 in correspondence of the side hinges 52. The cross-members 24',24" and the uprights 48', 48" define the aforesaid articulated quadrilateral 20.

Operationally, each of the uprights 48', 48" guides and supports an axle journal 60 of one of said front wheels 10',10".

Advantageously, as provided for example in the embodiments illustrated in FIGS. 8 to 11, the articulated quadrilateral rolling kinematic mechanism 20 can be made in such a way that each of the uprights 48', 48" guides and supports the axle journal 60 of the respective front wheel 10',10" coaxially with its main extension axis T-T. In this case, the suspension means 90 of each front wheel are integrated into the respective upright and give the axle journal 60 a rectilinear spring suspension motion along the main extension axis T-T of the upright 48', 48".

More in detail, the axle journal 60 comprises a sleeve disposed coaxially to the upright 48', 48". Between the axle journal 60 and the upright 48', 48" are disposed suspension means 90 of the wheel 10. For example, the suspension means 90 comprise a spring and/or a damper.

In particular, the uprights 48', 48" are hollow so as to house internally, at least partially, said suspension means 90. Preferably, the suspension means 90 are disposed coaxially to the respective upright 48', 48".

Preferably, according to such embodiments, the coupling between each axle journal 60 and the respective upright 48', 48" is of the cylindrical type, so as to allow both translation and rotation of the axle journal 60 with respect to the main extension axis T-T of the upright 48', 48". Each front wheel 10',10" has a steering axis S'-S',S"-S" that coincides with the axis of main extension (T-T) and of symmetry of the related upright 48',48".

In particular, each upright 48',48" extends from an upper end 48s to a lower end 48i. The rotation pin 68 of each front wheel 10',10" (integral with the axle journal 60) is disposed between the upper end 48s and the lower end 48i of the corresponding upright 48',48" of the articulated quadrilateral rolling kinematic mechanism 20.

Alternatively, as provided in the embodiments illustrated in FIGS. 1 to 7, the articulated quadrilateral rolling kinematic mechanism 20 can be made in such a way that each of the uprights 48', 48" guides and supports the axle journal 60 of the respective front wheel 10',10" externally to itself by means of a kinematic connection system of the roto-translational type.

More in detail, each axle journal 60 is supported by a support bracket 65 that in turn is hinged to the aforesaid articulated quadrilateral 20 by means of steering hinges 76 disposed in correspondence of the upper ends 48s and the lower ends 48i of each upright 48',48". These steering hinges 76 define the respective steering axes S'-S',S"-S" of the wheels 10',10", parallel to each other.

More in detail, the axle journal 60 is hinged to the support bracket 65 in correspondence of opposite upper and lower axial ends, by means of at least three tilting hinges 65a, 65b and 65c that define respective tilting axes B-B and that realise a roto-translational connection between the axle journal 60 and the support bracket 65. In particular, the axle journal 60 is hinged to the support bracket 65 through a connecting rod 66 by means of two of said hinges 65b and 65c.

The suspension means 90 of each front wheel can in particular be integrated in the respective axle journal 60. More in detail, the axle journal 60 includes a sheath inside which is inserted a spring (not visible in the figures) mechanically connected by a stem to the support bracket. The sheath is translatable with respect to the stem under the effect of the spring.

Operationally, such system defines a spring suspension motion along a curvilinear trajectory.

According to an embodiment not illustrated in the accompanying figures, the aforesaid rolling kinematic mechanism 20 can be a system of two suspended arms.

More in detail, such a system can comprise, in particular, two suspended arms, pivoted at their first ends to the forecarriage frame to rotate about a common rotation axis, transverse to the centreline plane M-M of the motor vehicle. In correspondence of their second ends, opposite to the first, both said arms are suspended by suspension means, in turn supported by a rocker arm, pivoted to the forecarriage frame. The rolling movement of the two front wheels 10' and 10" is permitted by the oscillation of the two suspended arms and the rocker arm. Each suspended arm supports at its second end an axle journal 60 of one of the two front wheels 10' and 10". In particular, each axle journal 60 is rotationally connected to the respective suspended arm to rotate about its own steering axis S-S. The steering device acts on two gripping portions integral with the axle journals.

According to the invention, the aforesaid roll control system 100 comprises a rod 110 that directly connects the two front wheels 10',10" to one another at the respective axle journals 60 to their own two ends by hinging means 72,73,74 that allow the rod 110 to passively follow the movements of the axle journals 60 themselves.

In particular, the rolling movements of the two front wheels 10',10" and the respective axle journals 60 cause variations of the lying position of the rod 110 with respect to a vertical projection plane, which is transverse to a centreline plane M-M of the motor vehicle.

"Lying position" of the rod 110 with respect to a vertical projection plane, which is transverse to a centreline plane M-M of the motor vehicle, means the angle formed by the projection of the rod 110 on that vertical plane.

Said vertical projection plane substantially corresponds to the rolling plane. Therefore, the vertical projection plane results to be perfectly orthogonal to the centreline plane M-M, when the wheels are parallel to centreline plane, or results to be inclined with respect to the centreline plane M-M, when the wheels are steering.

In other words, blocking the "lying position" of the rod 110 corresponds to selectively block the movements of the rod 110 kinematically corresponding to the rolling movements of the wheels 10', 10".

Operationally, a block of the lying position of said rod 110 with respect to a vertical projection plane, which is transverse to a centreline plane M-M of the motor vehicle, automatically determines the block of the angle formed by a lying plane of at least one wheel with respect to the ground. The lying plane of the wheel is orthogonal to the rotation axis of R'-R', R"-R" of the wheel itself. The rod 110—inasmuch as placed in connection of the axle journals of the wheels at their two ends—is obliged to follow the rolling movements of the two wheels by varying its lying position with respect to a vertical projection plane, which is transverse to a centreline plane M-M of the motor vehicle. In the moment in which the lying plane of said rod 110 is forcibly blocked, by virtue of this connection with the axle journals, also the lying position of the respective wheels is blocked, and consequently, the rolling movements of the two wheels are blocked, corresponding to variations of the angle α formed by a lying plane of each wheel with respect to the ground.

The blocking of the angle of a wheel also results in the blocking of the angle of the other wheel since the two front wheels 10',10" are kinematically connected to each other by means of said rolling kinematic mechanism 20 for rolling in a synchronous and specular manner.

All this applies independently of the configuration of such rolling kinematic mechanism 20, which in particular can be an articulated quadrilateral or suspended arms. In fact, the rod 110 acts on the axle journals 60 and not on the rolling kinematic mechanism 20.

According to the invention, the aforesaid rod 110 is thus usable directly or indirectly by the driver P as a command element to control the rolling movements of the two front wheels 10',10" without having to put his feet on the ground, adjusting the lying position of the rod 110 itself with his own body. By controlling the lying position of the rod 110 with his own body (with feet or hands), the driver P also controls the rolling movements of the two front wheels.

The command element 110, 120 is disposed so as to be accessible and manoeuvrable by the driver P from the accommodating area 15.

According to an embodiment not illustrated in the appended figures, said command element is the rod 110.

In the case of direct use of the rod 110 as the command element, the rod 110 must be disposed as close as possible to the accommodating area 15, so as to make it accessible and manoeuvrable by the driver P, for example by means of the legs. This configuration can impose major constraints in the design phase, it being necessary to find a compromise between the needs of mechanical simplification (which would suggest keeping the rod 110 as close as possible to the axle journals) and the need to make the rod 110 manoeuvrable by the driver P.

Preferably, the rod 110 is used indirectly as a command element of the roll control system and must not be operated directly by the driver P. For this purpose, according to the preferred embodiments illustrated in the accompanying figures, the roll control system 100 comprises a remote command element 120 that is mechanically connected to the aforesaid rod 110 by means of a kinematical connecting structure 130 in such a way that this remote command element 120 is suitable to move integrally with the rod 110 itself, reproducing at least the aforesaid variations of lying position of the rod 110 induced by the rolling movements of the two front wheels 10',10".

Figure 5:
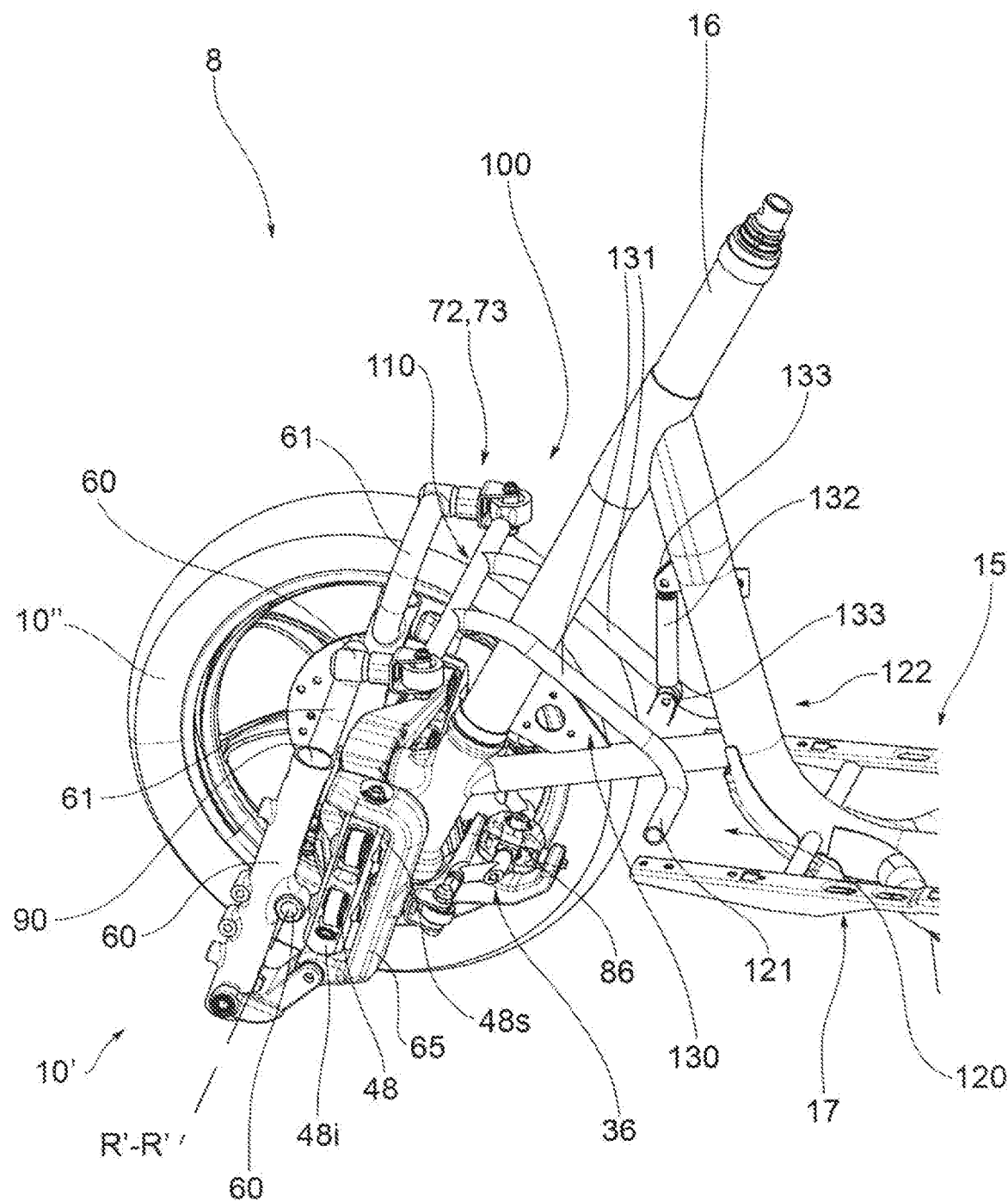
Figure 7:
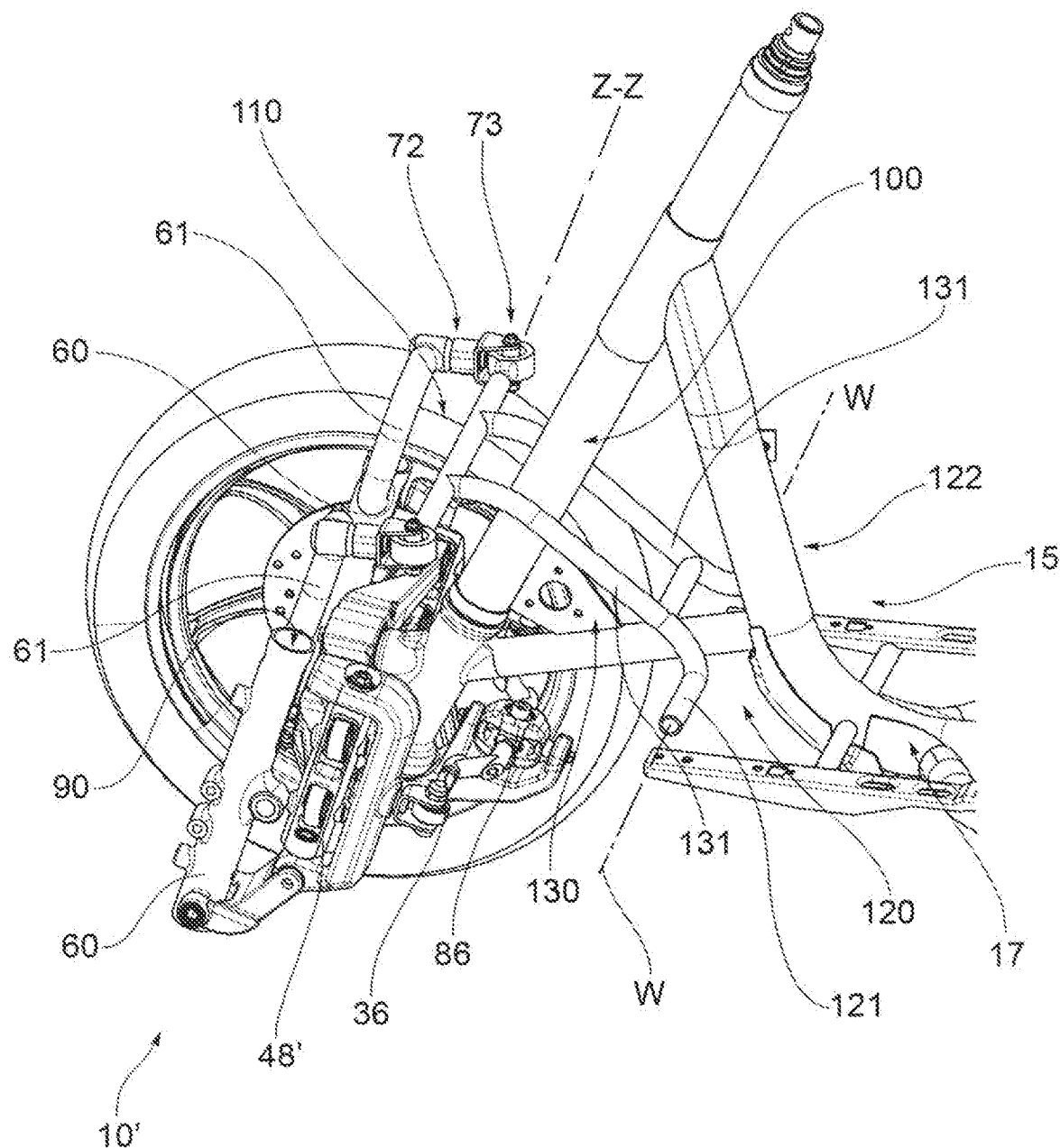
Figure 11:
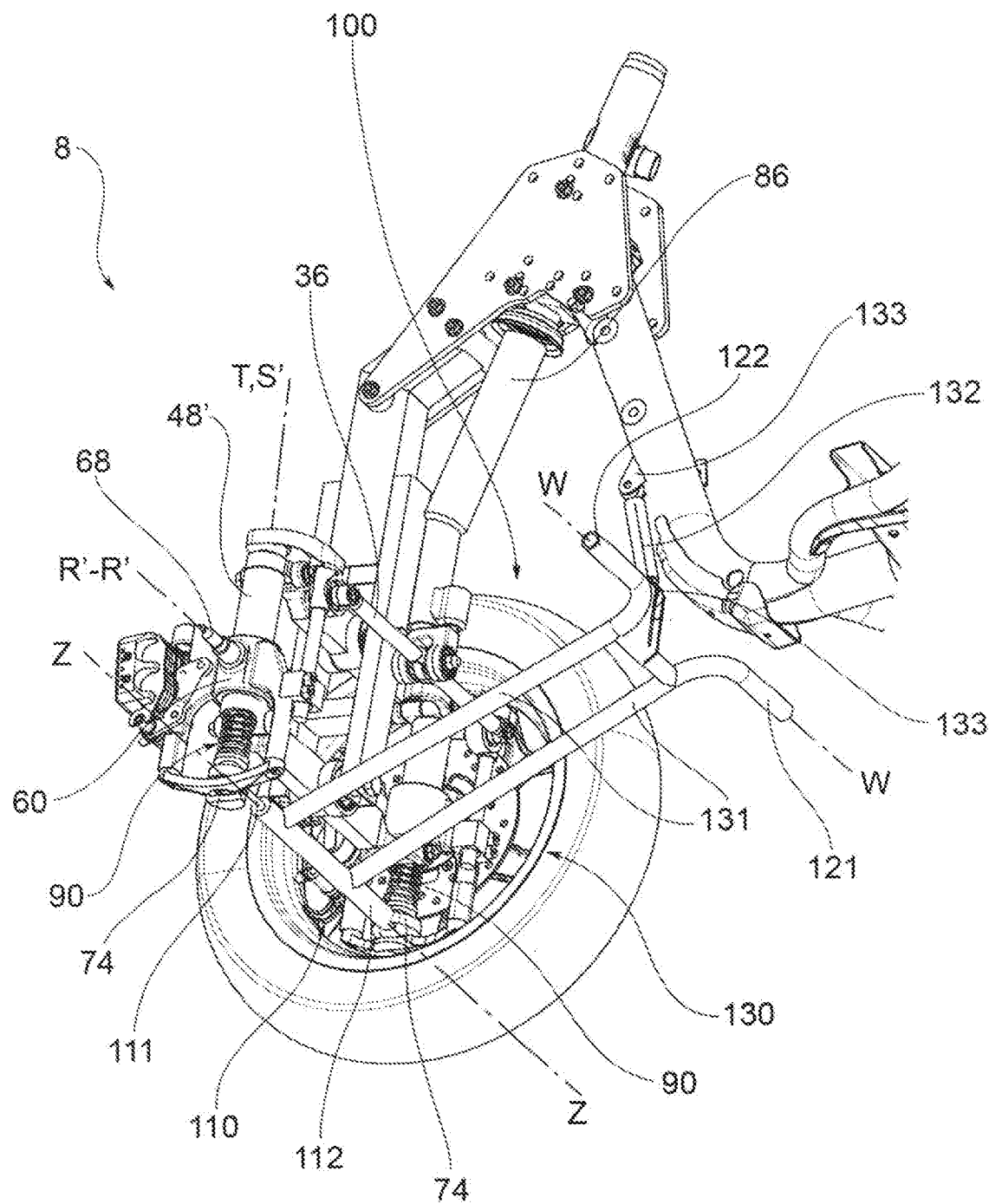
FIG. 11 shows a bottom perspective view of the forecarriage of the motor vehicle illustrated in FIG. 8.

As illustrated in particular in FIGS. 5, 7 and 11, the remote command element 120 is disposed in proximity to or inside the aforesaid accommodating area 15 of the driver P so as to be accessible by the driver P of the motor vehicle. Thanks to the remote command element 120, the driver P can manoeuvre the rod 110 indirectly and easily transfer sufficient force to it to govern the motor vehicle and keep it in balance.

Figure 2:
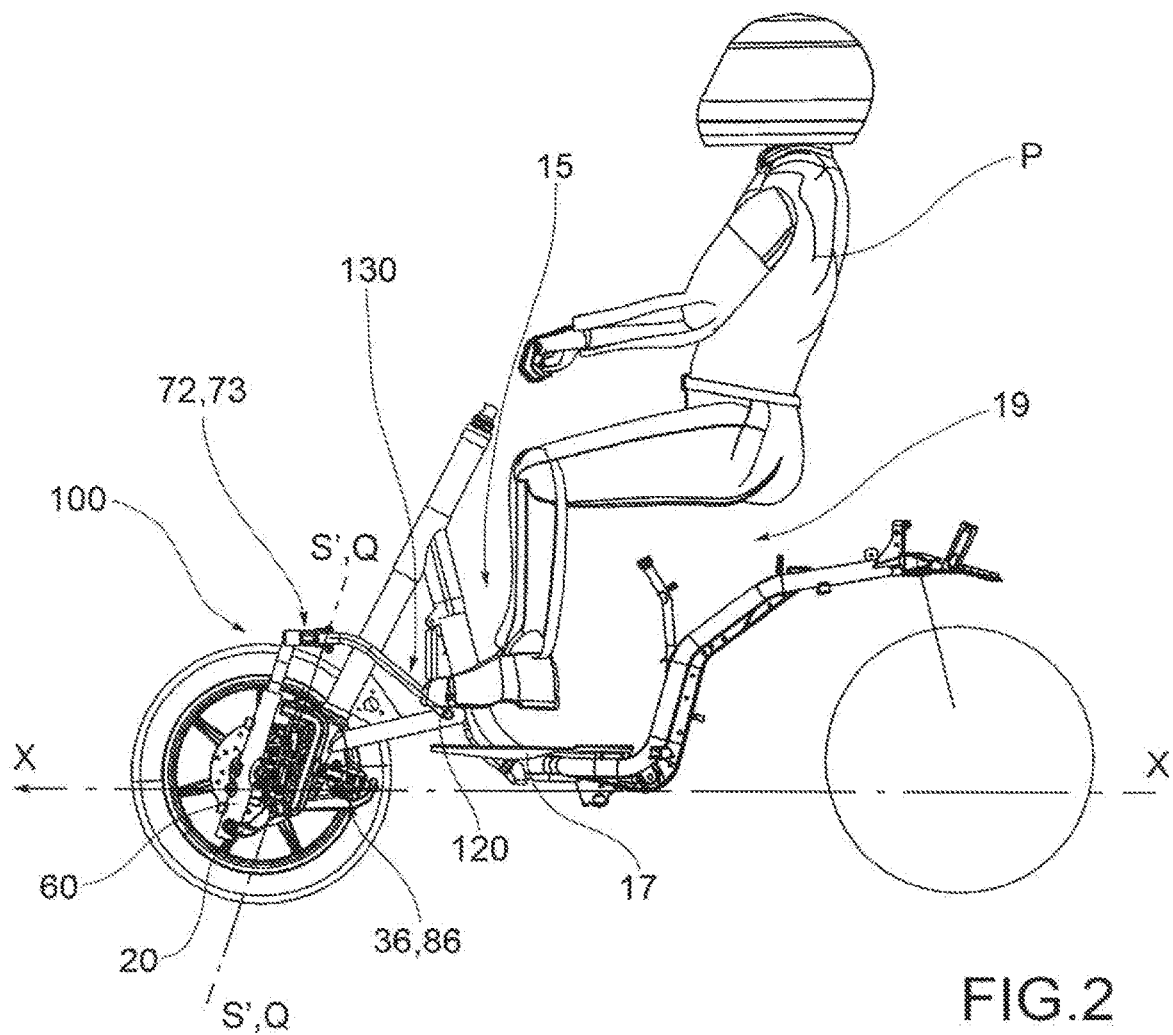
FIGS. 2 and 3 show two orthogonal views, respectively side and plan view, of the motor vehicle of the figure, according to the arrows II and III shown therein.
Figure 3:
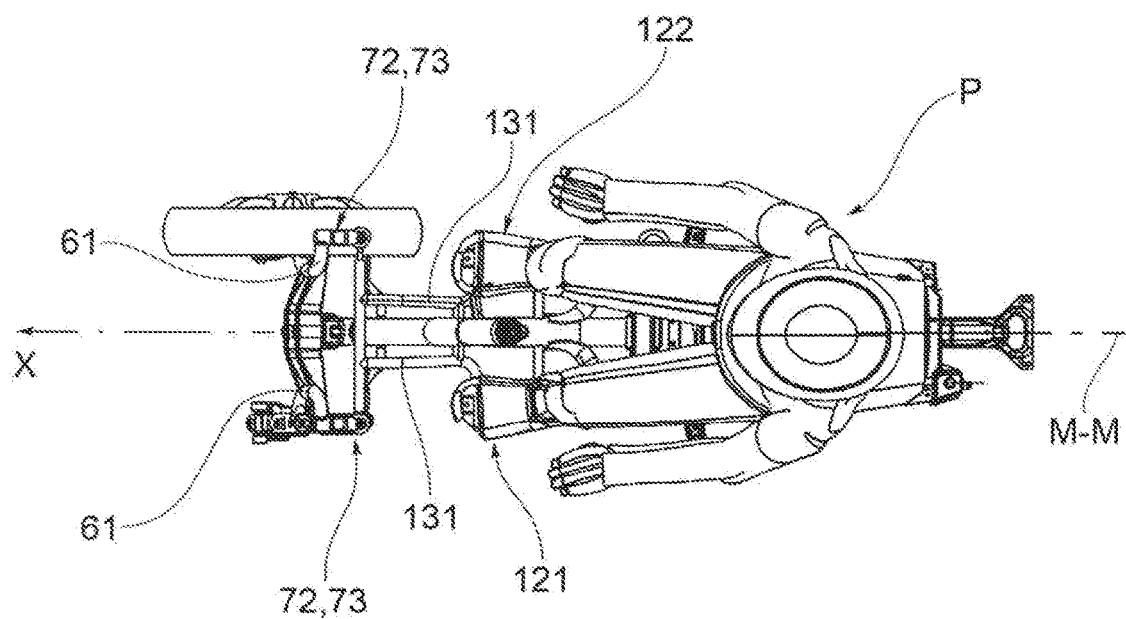
Figure 4:
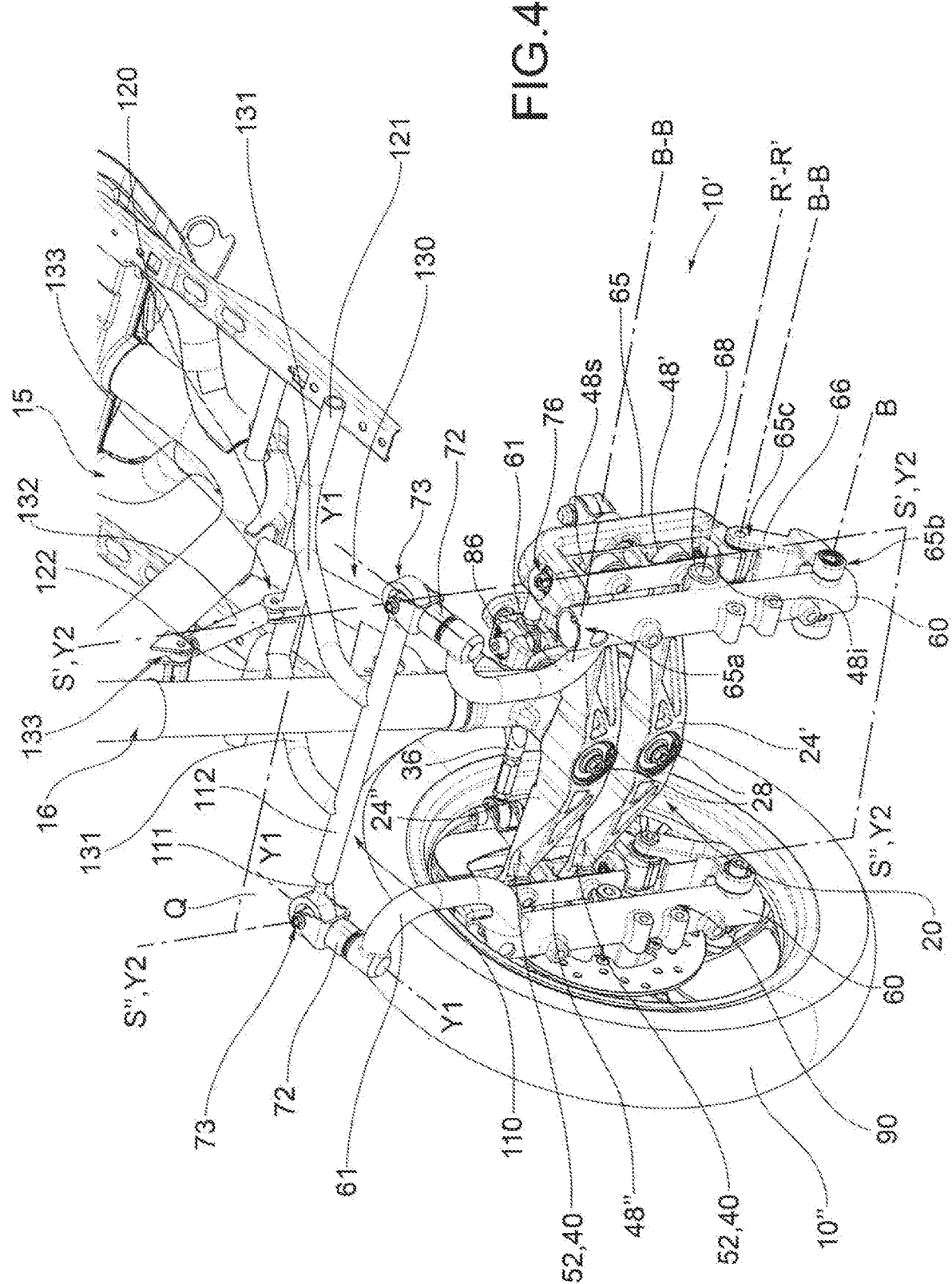
FIGS. 4 and 5 show two perspective views, respectively front and side, of the forecarriage of the motor vehicle illustrated in FIG. 1.

Preferably, as illustrated in the accompanying figures, and in particular in FIGS. 1, 2 and 3, the aforesaid remote command element 120 consists of a footboard so as to be directly actuatable with the feet of the driver P. In particular, the remote command element 120 configured as a footboard is positioned in proximity of the footrest footboard 17 of the motor vehicle 4.

According to an embodiment not illustrated in the accompanying figures, the aforesaid remote command element 120 can be constituted by a grippable structure so as to be actuatable with the hands of the driver P. In this case, the remote command element 120 configured as a grippable structure is positioned preferably in proximity of the handlebar (not shown) of the motor vehicle 4.

Functionally, as already illustrated, the remote command element 120 follows the movements of the rod 110 induced by the rolling movements of the front wheels 10',10". The kinematic connection between the rod 110 and the remote command element 120 also operates in the reverse direction in the sense that any kinematic movements or constraints imposed on the remote command element 120 are transferred to the rod 120 and thus to the axle journals 60 and finally to the associated front wheels 10',10".

In other words, as the rolling movements of the two front wheels 10',10" determine variations of the lying position of the rod 110 and are reflected on the remote command element 120 so—for kinematic reversal—a control of the lying position of the rod 110 exercised through said remote command element translates into a direct control of the rolling movements of the two front wheels 10',10".

In particular, the control of the lying position of the rod 110 can be configured as a block of the lying position of the rod and thus as a block of the rolling of the front wheels.

Advantageously, the roll control—in particular if exercised as a roll block—can be implemented by the driver P in order to stabilise the motor vehicle 4, keeping it in balance without inclinations when stopped or when traveling at reduced speeds, without requiring the support of the feet on the ground.

Operationally, thanks to the invention, the driver P can implement the aforesaid roll control (and possibly block) by acting directly on the rod 110 or indirectly by acting on the aforesaid remote command element 120. In this way in fact the driver P can actively control (and possibly block) the lying position of the rod 110, and thus the rolling movements of the two front wheels 10',10", without having to rest the feet on the ground.

So, the roll control system according to the invention ensures effectiveness of intervention in terms of roll control, and possibly also of roll block, through a direct mechanical command by the driver of purely "manual" type. The roll control system according to the invention is also mechanically simple and inexpensive to produce, as will be taken up again below, working without the support of electronics.

In fact, "direct mechanical command of purely manual type" means a command exercised by the driver without automatisms managed by an electronic control system.

As already noted in the introduction, in the known solutions, roll blocking is implemented by blocking all the elements responsible for rolling, i.e., arms, forks/rocker arms and suspensions. Differently, according to this invention, roll control (which can possibly also be configured as roll block) is achieved by mechanically controlling the lying position of a rod 110 that interconnects the two front wheels with each other, by operating only between two elements responsible for rolling, i.e., the axle journals of the wheels.

The interconnection of the two wheels in correspondence of the respective axle journals makes the roll control system according to this invention selective for rolling movements.

In fact, as already noted above, the suspension means 90 provide the axle journals themselves at least a spring suspension motion with respect to the rolling kinematic mechanism 20. The axle journals are therefore associated to the wheels in spring suspension motions. For this reason, their mutual interconnection by means of the roll control system according to the invention (even when actuated) does not interfere with pitching movements (symmetrical spring suspension motion). It follows therefore that the roll control system according to the invention is always transparent to pitching movements.

Preferably, as illustrated in the accompanying figures, the rod 110 is extensible in length parallel to a direction of conjunction between the two axle journals 60.

In particular, such extendable length rod 110 is formed by at least two portions 111 and 112 telescopically associated with each other according to a direction of main longitudinal extension Z-Z.

Preferably, the two rod portions 111 and 112 of the rod 110 are associated to each other with a cylindrical coupling to allow free mutual rotation around the aforesaid direction Z-Z of main longitudinal extension.

Functionally, thanks to the fact that the rod 110 that directly connects the two axle journals 60 is free to extend in length parallel to a direction of conjunction between the two axle journals, the roll control system 100 according to the invention (even when actuated by the driver) does not interfere with steering movements. In fact, the extensibility of the rod 110 allows not influencing either parallel steering or kinematic steering.

It follows therefore that the roll control system according to the invention—in the preferred case of extensible length rod—is transparent also to steering and not only to pitching.

The rod 110 can connect the two axle journals 60 to each other with any orientation with respect to the axle journals themselves, and thus to the ground. For example, the rod 110 can connect the two axle journals 60 to each other at different heights from the ground, so as to be oblique with respect to the axle journals and the ground.

Preferably, as illustrated in the accompanying figures, the rod 110 connects the two axle journals 60 together at a same height from the ground, so as to be parallel to the ground. Disposing the rod 110 parallel to the ground can be advantageous for a driver in terms of simplicity of use of the roll control system according to the invention.

More in detail, in the case of direct use of the rod 110 as the command element, the rod 110 in fact reproduces the ground. This simplifies the driver's intervention. In fact, the use of the roll control system will be spontaneous and immediate as it requires the same actions that a driver performs when he keeps a stopped motor vehicle in balance with his own body, by resting his feet on the ground. In some way, the rod 110 is a "virtual ground".

As will be taken up again below, this advantage in terms of ease and immediacy of use can easily be achieved with the remote control element 120.

The rod 110 can connect the two axle journals 60 to each other with any orientation with respect to the rolling kinematic mechanism 20.

Figure 9:
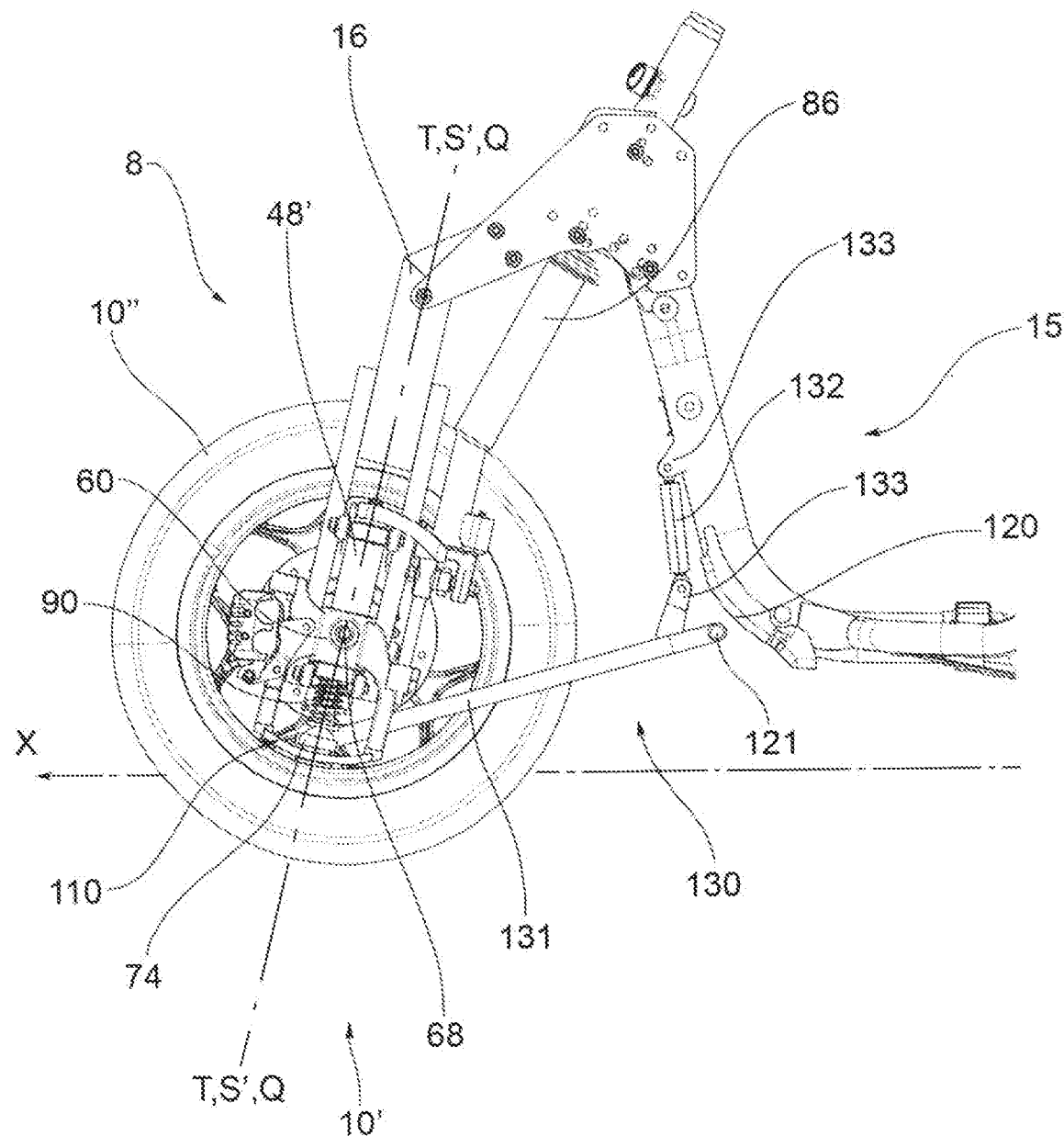
FIGS. 9 and 10 show two orthogonal views, respectively side and bottom, of the forecarriage of the motor vehicle illustrated in FIG. 8 of the motor vehicle of the figure, according to the arrows IX and X shown therein.

Preferably, as illustrated in particular in FIGS. 2 and 9, the rod 110 is coplanar or at least parallel to the rolling plane Q of the two front wheels 10',10" defined by the rolling kinematic mechanism 20. This disposition allows reducing to a minimum the displacements of the rod 110 (or at least keeping them in the rolling plane) during normal use of the motor vehicle, in case of its rolling, i.e., when the remote command element 120 is not actively managed by the driver P.

"Rolling plane" means a plane transverse to the longitudinal direction X-X or the direction of travel of the motor vehicle, and thus incident to the centreline plane M-M of the motor vehicle.

Preferably, as illustrated in the accompanying figures, in the case where the rolling kinematic mechanism 20 is constituted by an articulated quadrilateral, said rod 110 is substantially parallel to the cross-members 24 of the articulated quadrilateral.

Figure 8:
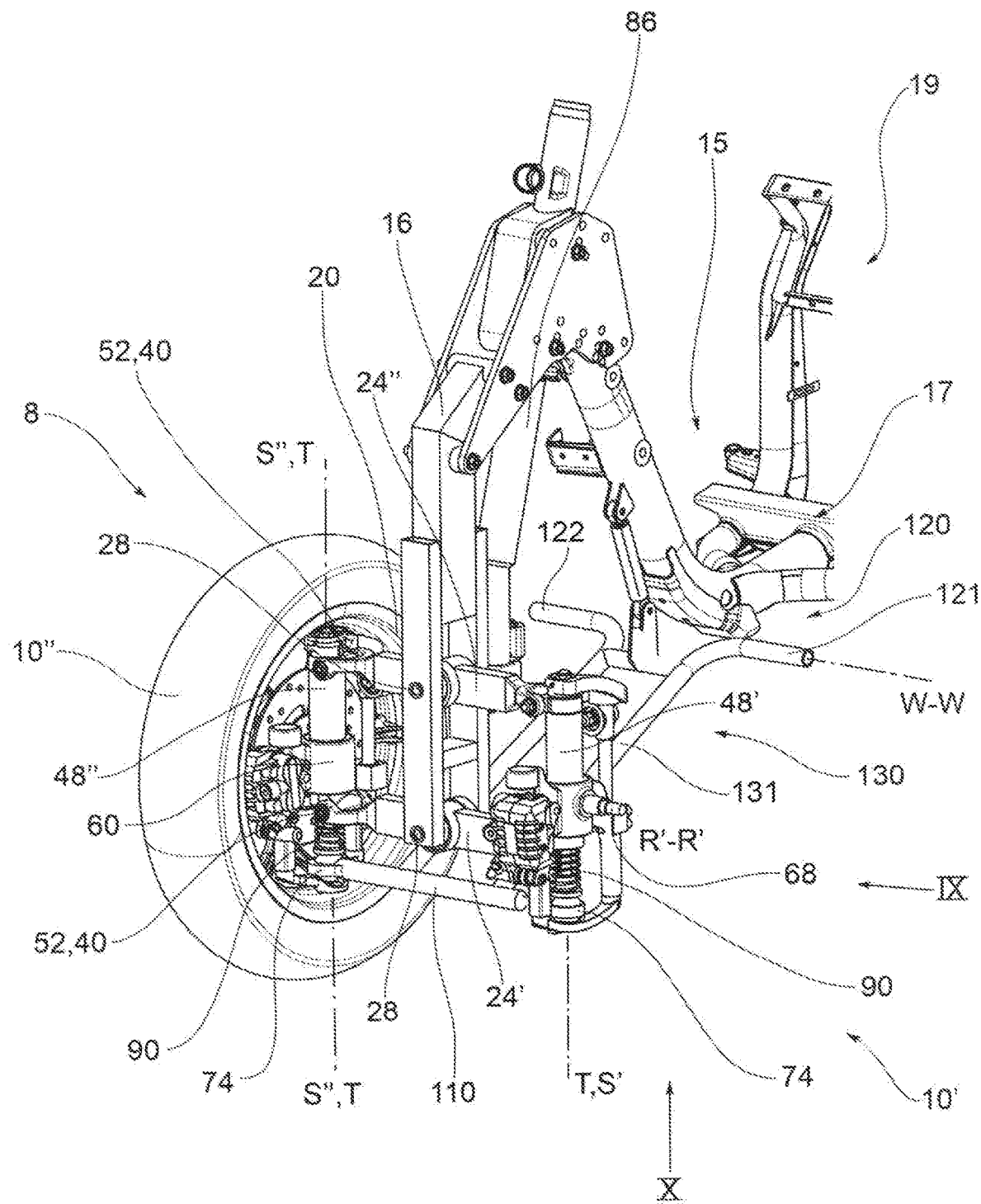
FIG. 8 is a partially schematised front perspective view of the forecarriage of a motor vehicle with roll block system according to a second embodiment of the invention and provided with an articulated quadrilateral roll kinematic mechanism of the type that guides and supports the axle journals of the wheels coaxially to the main extension axes of the uprights.
Figure 10:
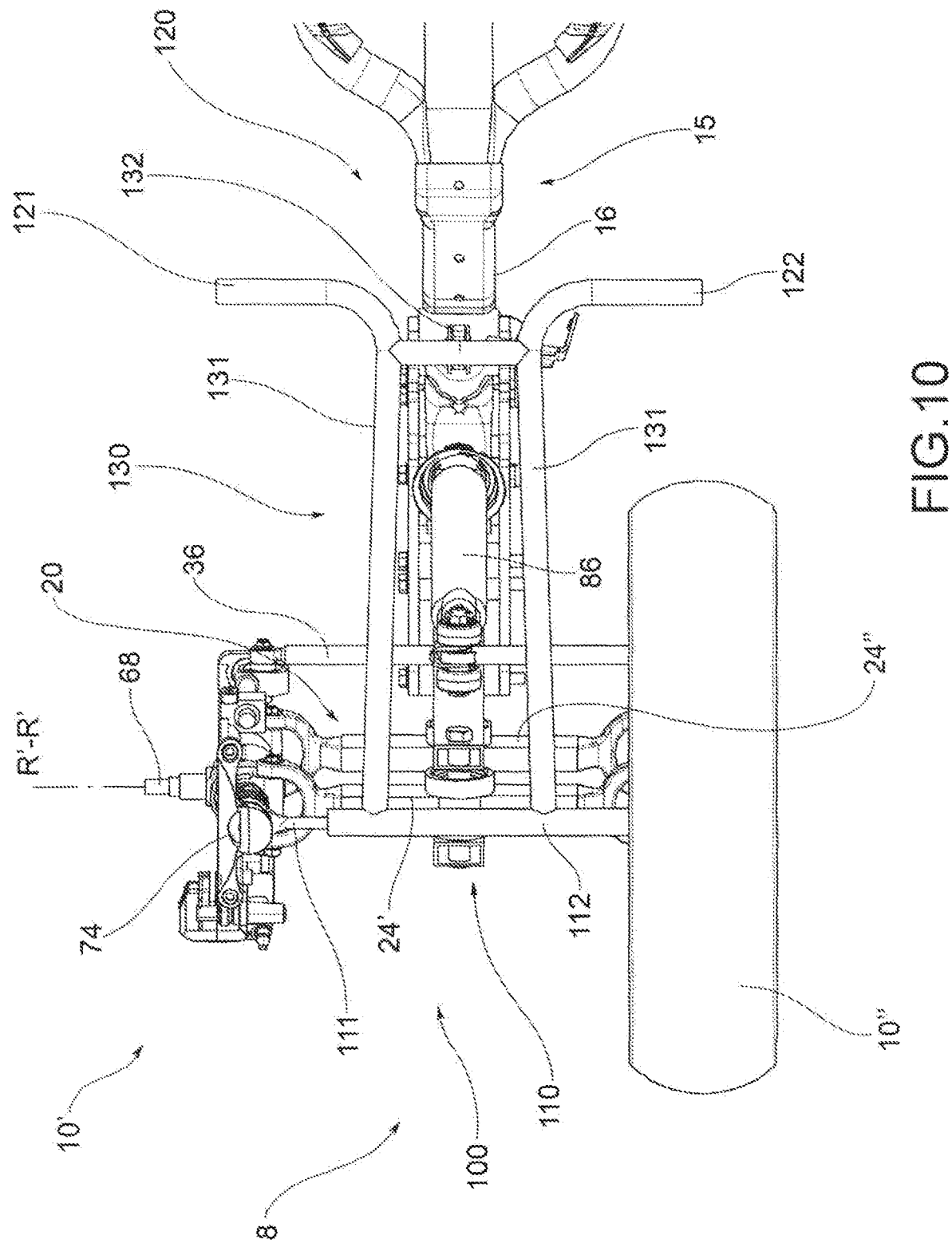

As illustrated in FIGS. 8 to 10, the rod 110 can be connected directly to the axle journals 60 at their two ends by the aforesaid hinging means 72,73,74.

Alternatively, as illustrated in FIGS. 1 to 7, the rod 110 can be connected to each axle journal 60 in correspondence of a support appendix 61. Each support appendix 61 is integral with the respective axle journal 60 itself.

Preferably, each support appendix 61 extends overhanging from the respective axle journal 60. In particular, the connection between support appendix 61 and rod 110 (by interposition of the hinging means 72,73,74) is realised at the free end of the support appendix 61.

Advantageously, as illustrated in FIGS. 1 to 7, the rod 110 is positioned over the two front wheels 10'10" and is supported at each of its ends by means of a respective support appendix 61. For this purpose, the support appendices 61 are suitably shaped to not interfere with the movements of the front wheels. The positioning of the rod 110 above the front wheels offers more choice in the spatial disposition of the rod itself, avoiding space problems. In particular, it avoids problems of lack of space in the case in which the rod 110 is positioned underneath the axle journals, as illustrated in FIGS. 8 to 11. In addition, as will be taken up again below, positioning above the wheels allows exploiting—in particular conditions—the rod 110 as support for a mudguard.

The positioning of the rod 110 above the wheels is particularly indicated for adoption in the case in which the articulated quadrilateral rolling kinematic mechanism 20 is realised in such a way that each of the uprights 48', 48" guides and supports the axle journal 60 of the respective front wheel 10',10" externally to itself by means of a kinematic connection system of the roto-translational type. as illustrated in FIGS. 1 to 7. In fact, in this case, such positioning of the rod is easier to accomplish. In this type of articulated quadrilateral, the steering axes are outside of the axle journals. Therefore, putting the hinges 72,73 of the rod 110 transverse in correspondence of the steering axes of wheels could create space problems with the wheels.

Preferably, the aforesaid hinging means 72,73,74, with which said rod 110 is connected at both its ends directly on the axle journals 60 or on said support appendices 61, are constituted by a ball joint 74 or of a device 72,73 kinematically equivalent to a ball joint. In this way, the rod 110 is able to support the movements of the two front wheels 10',10" in relation to each other and with respect to the forecarriage 16 without causing jamming or blocks.

In particular, as illustrated in FIGS. 4 to 7, the device kinematically equivalent to a ball joint is constituted by a pair of cylindrical hinges 72,73 having axes orthogonal to each other, wherein a first hinge 72 of said pair has its hinge axis Y1-Y1 orthogonal to the rolling plane Q of the two front wheels 10',10" defined by said rolling kinematic mechanism 20. In this way, the rod 110 can move parallel to the aforesaid rolling plane when its lying position is not controlled by the driver by means of the remote command element 120.

Advantageously, the second hinge 73 of each pair of hinges has its hinge axis Y2-Y2 substantially aligned or parallel to the steering axis S'-S',S"-S" of the respective axle journals 60.

Preferably, as illustrated in particular in FIGS. 4 to 7, in the case in which the hinging means adopted are a pair of cylindrical hinges 72 and 73 with mutually orthogonal axes, a first hinge 72 has its hinge axis Y1-Y1 orthogonal to the rolling plane Q of the two front wheels 10',10" and is the hinge responsible for making the rod 110 follow the rolling movements, while the second hinge 73 has its hinge axis Y2-Y2 substantially aligned or parallel to the steering axis S'-S',S"-S" of the respective axle journals 60 and is the hinge responsible for making the rod 110 follow the steering movements.

Preferably, as illustrated in the accompanying figures, the hinging means 72,73,74 are placed in correspondence, or in proximity, of the steering axis S'-S', S"-S" of the respective axle journals 60.

In particular, in the case in which the hinging means at each end of rod 110 are constituted by a pair of hinges, one 72 for rolling and one 73 for steering, the intersection of the axes of the rolling and steering hinges at the ends of the bar itself takes place in proximity of the steering axis near the axis of the respective wheel. In this way, the rod 110 remains almost stationary during steering. Of course with the travel of the suspensions, which have a non-rectilinear but roto-translational motion, the aforesaid intersection of the hinging axes does not rest exactly on the steering axis but still moves slightly.

Advantageously, in this entirely preferred case, the rod 110 is subject only to the spring suspension motions to which the axle journals 60 are subject and is substantially not influenced by steering movements. By disposing the rod 110 above the wheels (as illustrated in FIGS. 1 to 7), the rod 110 can thus be used to create a mudguard for all the entire forecarriage 8 of the motor vehicle 4, similarly to the bodywork of an automobile.

As already said above, preferably, the rod 110 is used indirectly as a command element of the roll control system and must not be manoeuvred directly by the driver P. This is implemented by means of the aforesaid remote command element 120, which is mechanically connected to the aforesaid rod 110 through a kinematical connecting structure 130.

Preferably, the kinematical connecting structure 130 rigidly connects the remote command element 10 to the rod 110.

In particular, the aforesaid kinematical connecting structure 130 comprises two arms 131 that connect the remote command element 120 to the rod 110 forming a frame with it. The connections between the arms, rod and remote command element are rigid.

Preferably, the remote command element 120 is constituted by two elongated elements 121 and 122, each of which extends in a longitudinal direction of main development W-W. The presence of two elongated elements is preferred, since it allows defining two manoeuvring points for the driver, for example by means of the feet or hands.

Preferably, the aforesaid two elongated elements 121 and 122 are aligned with each other along a common longitudinal direction W-W.

Advantageously, the longitudinal direction of main development W-W of the two elongated elements 121 and 122 is parallel to the longitudinal direction of main development Z-Z of the rod 110. In this way, the remote command element 120 (defined by the two elongated elements 121 and 122) can reproduce the movements of the rod 110 in a kinematically direct way. In the preferred case already described in which the rod 110 is parallel to the ground, the remote command element 120 is thus also parallel to the ground and, practically, constitutes a "virtual ground" for the driver. Also in the case of indirect command of the rod 110, the intervention of the driver is simplified. In fact, the driver is offered a spontaneous and immediate rolling control logic. The actions required are the same that a driver performs when he keeps a stopped motor vehicle in balance with his own body, by resting his feet on the ground.

Preferably, the aforesaid common longitudinal direction W-W is transverse to a centreline plane M-M of the motor vehicle and is parallel to the ground.

The aforesaid two elongated elements 121 and 122 can be connected together to form a single piece or can constitute two separate elements (as illustrated in the accompanying figures). In this second case, the positioning of the remote command element 120 in the accommodating area 15 is simplified, as it has a more reduced size. In particular, it is possible to dispose the steering column 86 between these two elongated elements.

Preferably, each of the two arms 131 of the kinematical connecting structure 130 connects the aforesaid rod 110 to one of said two elongated elements 121 and 122.

Advantageously, the aforesaid kinematical connecting structure 130 is connected to only one telescopic portion 112 of the rod extensible in length 110 so as not to interfere with the extensibility in length of said rod 110.

Figure 6:
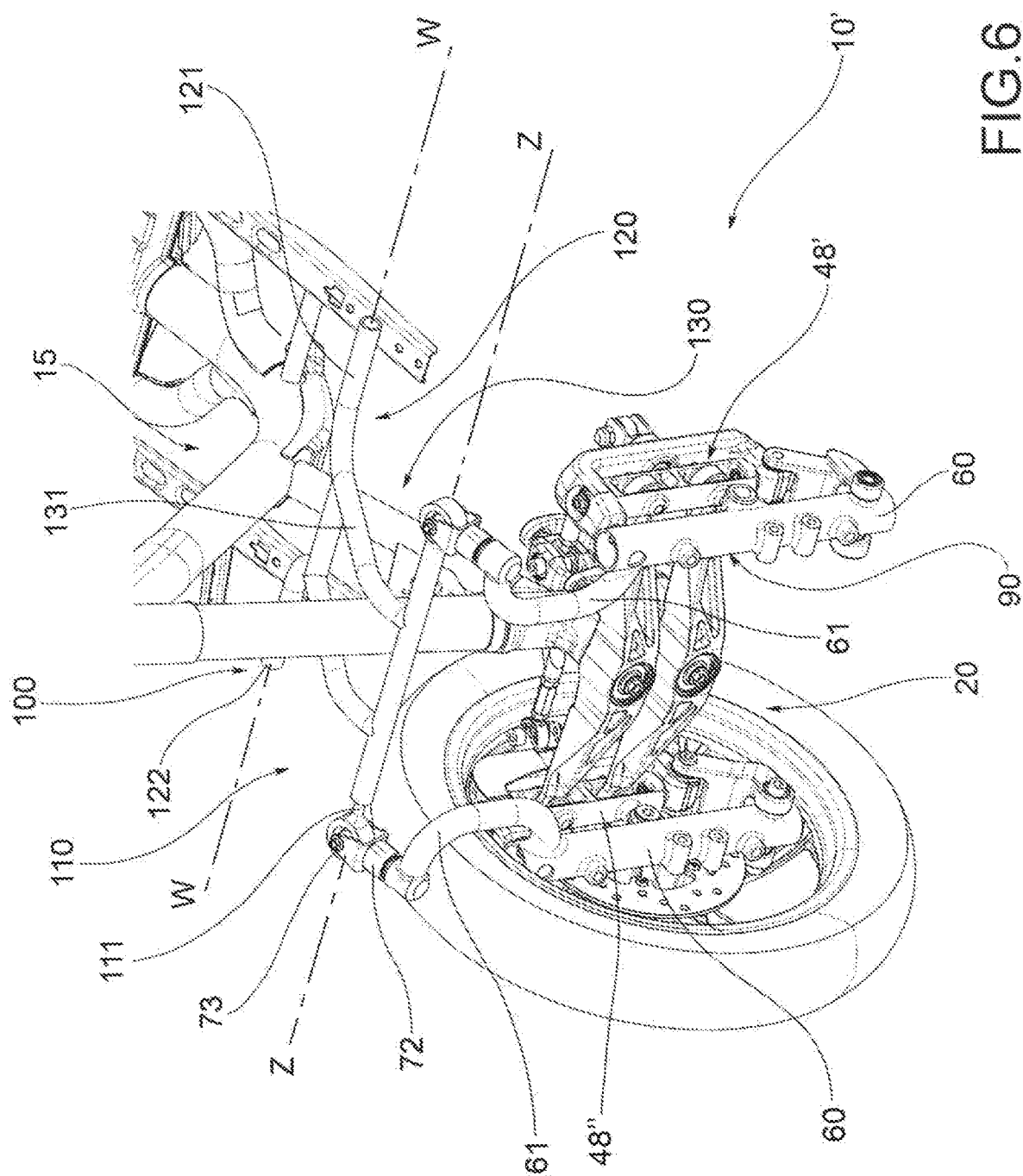
FIGS. 6 and 7 show two perspective views, respectively front and side, of a variant of the forecarriage of the motor vehicle illustrated in FIG. 1.

According to the embodiment illustrated in FIGS. 6 and 7, the kinematical connecting structure 130 is connected to said rod 110 in a cantilever way. The remote command element 120 is thus supported directly by the rod 110 and the stresses exerted on it, as well as its own weight, are discharged on the axle journals through the hinging means. In this case, in order to maintain the remote command element 120 in position, it is necessary that the hinging means be constituted by the above-described pair of cylindrical hinges 72,73 with orthogonal axes. The use of ball joints 74 would not allow sustaining cantilevered the remote command element 120 with the related kinematical connecting structure 130.

According to the preferred embodiments, illustrated in FIGS. 4 and 5 and FIGS. 8 to 11, the aforesaid kinematical connecting structure 130 is connected to said forecarriage frame 16 for example by means of a support connecting rod 132 with ball joints 133 at both its ends. In this case, it is possible to use, indifferently, either ball joints or pairs of cylindrical hinges as hinging means. In fact, in this case, the stresses exerted on the remote command element 120, as well as its own weight, are discharged on the forecarriage frame 16 through the connecting rod 132. The presence of the ball joints 133 prevents the connecting rod 132 from interfering in the kinematic transmission between the rod 110 and remote command element 120.

This invention relates to a method of controlling the rolling movements of a rolling motor vehicle 4 with three or four wheels, according to this invention, and in particular as described above.

This method comprises:

a) providing a motor vehicle 4 according to the invention, and in particular as described above;

b) a roll control step, in which the rod 110 of the roll control system 100 of said motor vehicle 4 is operated by the driver P of the motor vehicle, directly or indirectly by means of said remote command element 120, to control the lying position of said rod 110 and thus control the rolling movements of the two front wheels 10' 10" without having to put his feet on the ground; and c) a step of no roll control, in which the rod 110 or, if present, the remote command element 120 is not controlled by the driver P of the motor vehicle to let the rod 110 follow the rolling movements of the two front wheels 10',10" without interfering with them.

The roll control step b) and the no roll control step c) of the motor vehicle can alternate according to various sequences, depending on the driving situations imposed by the movement of the motor vehicle.

In particular, roll control step b) can be implemented by the driver P in order to stabilise the motor vehicle 4, when stopped or when travelling at reduced speeds, without requiring the support of the feet on the ground.

No roll control step c) is implemented by the driver P when the motor vehicle is in motion and active roll control is not necessary.

Preferably, the rod 110 and, if present, the remote command element 120 of the roll control 100 are parallel to the ground. In roll control step b), the driver P controls, and possibly blocks, the rolling of the motor vehicle 4 using the rod 110 or remote command element 120 as a virtual ground support.

The invention allows obtaining many advantages in part already described.

The motor vehicle 4 according to the invention is equipped with a roll control system that ensures effectiveness of intervention in terms of roll control, and possibly also in terms of blocking the roll, by means direct mechanical command of the driver of a purely "manual" type and that is, at the same time, mechanically simple and inexpensive to produce.

Operationally, thanks to the invention, the driver P can implement the aforesaid roll control (and possibly block) by acting directly on the rod 110 or indirectly by acting on the aforesaid remote command element 120. In fact, in this way the driver P can actively control (and possibly block) the lying position of the rod 110, and thus the rolling movements of the two front wheels 10',10", without having to rest the feet on the ground.

The roll control system according to the invention can be realised so as to be usable by the driver in a completely manual way according to a very simple and immediate logic of use. In fact, particularly in the case in which the rod 110 and the remote command element 120 are parallel to the ground, they virtually reproduce the ground. This simplifies the driver's intervention. In fact, the use of the roll control system will be spontaneous and immediate as it requires the same actions that a driver performs when he keeps a stopped motor vehicle in balance with his own body, by resting his feet on the ground.

Advantageously, the roll control system does not inhibit pitching of the motor vehicle due to symmetrical compression of the shock absorbers, and can be easily implemented in such a way that, when actuated, it does not even influence steering.

The roll control system is also constructively simple and economical to produce and to mount on the motor vehicle itself. This makes it suitable for rolling motor vehicles intended for low or lower-middle price ranges, as can be, in particular, motor vehicles intended for markets in developing countries.

Finally, the roll control system according to the invention does not depend on the configuration of such rolling kinematic mechanism 20, which in particular can be an articulated quadrilateral or suspended arms.

Therefore, the invention thus conceived achieves the predefined purposes.

Obviously, it may even assume, in its practical embodiment, forms and configurations different from that illustrated above without, for this reason, departing from the present scope of protection.

Moreover, all the details may be replaced by technically equivalent elements and the dimensions, forms and materials used may be any according to the needs.

The invention claimed is:

1. A rolling motor vehicle with three or four wheels, comprising a frame extending from a forecarriage, which supports at least two front wheels, to a rear which supports one or more wheels, said frame defining an accommodating area conformed to accommodate a driver, said forecarriage in turn comprising:

a forecarriage frame, at least one pair of front wheels kinematically connected to each other and to the forecarriage frame by means of a rolling kinematic mechanism which enables the front wheels to roll in a synchronous and specular manner, each wheel being connected to said rolling kinematic mechanism by means of a respective axle journal, said axle journal being mechanically connected to a rotation pin of the wheel in order to support it rotatably around an axis of rotation, a roll control system of the motor vehicle, suspension means which guarantee each axle journal at least one spring suspension movement with respect to said rolling kinematic mechanism, characterised in that said roll control system comprises a rod, which connects the two front wheels directly to each other at the respective axle journals at its two ends by means of hinging means which enable said rod to passively follow the movements of the axle journals, the roll movements of the two front wheels and of the respective axle journals causing changes in the lying position of said rod with respect to a vertical projection plane, which is transverse to a centre line plane of the motor vehicle, said rod being usable directly or indirectly by the driver as a command element of the roll control system to control the rolling movements of the two front wheels without having to put his feet on the ground by adjusting the lying position of said rod with his body, wherein said command element is disposed so as to be accessible and manoeuvrable by the driver from said accommodating area.

2. The rolling motor vehicle according to claim 1, wherein said rod connects the two axle journals to each other at the same height from the ground.

3. The rolling motor vehicle according to claim 1, wherein the rod is coplanar or parallel to the rolling plane of the two front wheels defined by the rolling kinematic mechanism.

4. The rolling motor vehicle according to claim 1, wherein said rod is connected directly to the axle journals at its two ends by means of said hinging means.

5. The rolling motor vehicle according to claim 1, wherein said rod is connected to each axle journal at a support appendix by means of said hinging means, said support appendix being integral with the respective axle journal.

6. The rolling motor vehicle according to claim 5, wherein said rod is placed over the two front wheels, and is supported at each of its ends by means of the respective support appendix.

7. The rolling motor vehicle according to claim 1, comprising a steering device which kinematically connects the axle journals to one another so as to command the rotation of the axle journals around respective steering axes of each front wheel, wherein said hinging means are placed at or near the steering axes of the respective axle journals.

8. The rolling motor vehicle according to the claim 7, wherein the second hinge of said pair has its hinge axis substantially aligned or parallel to the steering axis of the respective axle journals.

9. The rolling motor vehicle according to claim 1 wherein said hinging means, with which said rod is linked at both its ends directly on the axle journals or on said support appendices, consist of a ball joint or of a device kinematically equivalent to a ball joint.

10. The rolling motor vehicle according to claim 9, wherein said device kinematically equivalent to a ball joint consists of a pair of cylindrical hinges having axes orthogonal to each other, wherein a first hinge of said pair has its hinge axis orthogonal to the rolling plane of the two front wheels defined by said rolling kinematic mechanism.

11. The rolling motor vehicle according to claim 1, wherein said rod is extensible in length parallel to a direction of conjunction between the two axle journals.

12. The rolling motor vehicle according to claim 11, wherein said rod extensible in length is made of at least two portions telescopically associated to each other in a direction of main longitudinal extension.

13. The rolling motor vehicle according to claim 1, wherein said command element is said rod.

14. The rolling motor vehicle according to claim 1, wherein said roll control system comprises a remote command element which is separate from the rod and is mechanically connected to said rod by means of a kinematical connecting structure so that said remote command element is suitable to move integrally with said rod reproducing at least said changes in the lying position of said rod, said remote command element being placed near or inside said area for accommodating the driver so as to be accessible to the driver of the motor vehicle, said driver being able to act directly on said remote command element to control the lying position of said rod and thus to control the rolling movements of the two front wheels without having to put his feet on the ground.

15. The rolling motor vehicle according to claim 14, wherein said remote command element consists of a footboard so that it can be operated by the feet of the driver.

16. The rolling motor vehicle according to claim 14, wherein said remote command element is configured as a structure configured for gripping so as to be operable by the hands of the driver.

17. The rolling motor vehicle according to claim 14, wherein the kinematical connecting structure rigidly connects said remote command element to said rod.

18. The rolling motor vehicle according to claim 17, wherein said kinematical connecting structure comprises two arms which connect the remote command element to said rod forming therewith a frame.

19. The rolling motor vehicle according to claim 18, wherein said remote command element consists of two elongated elements, each of which extends in a direction of main longitudinal extension parallel to a direction of main longitudinal extension of said rod.

20. The rolling motor vehicle according to claim 19, wherein said two elongated elements are aligned with each other in a common longitudinal direction, said common longitudinal direction being transverse to the centreline plane of the motor vehicle and being parallel to the ground.

21. The rolling motor vehicle according to claim 19, wherein said two elongated elements are connected to each other to form a single piece or constitute two separate elements.

22. The rolling motor vehicle according to claim 19, wherein each of said two arms of the kinematical connecting structure connects said rod to one of said two elongated elements.

23. The rolling motor vehicle according to claim 22, wherein said rod is extensible in length parallel to a direction of conjunction between the two axle journals and the kinematical connecting structure is connected to only one portion of said rod extensible in length so as not to interfere with the extensibility in length of said rod.

24. The rolling motor vehicle according to claim 14, wherein said kinematical connecting structure is connected to said rod in a cantilever way.

25. The rolling motor vehicle according to claim 14, wherein said kinematical connecting structure is connected to said forecarriage frame by means of a support connecting rod with ball joints at both its ends.

26. The rolling motor vehicle according to claim 1 wherein the vehicle comprises two rear drive wheels at the rear.

27. A method of controlling the rolling movements of a rolling motor vehicle with three or four wheels, said method comprising:
   a) providing a motor vehicle according to claim 1;
   b) a roll control step, in which the rod of the roll control system of said motor vehicle is operated by the driver of the motor vehicle, directly or indirectly by means of a remote command element which is separate from the rod and is mechanically connected to said rod by means of a kinematical connecting structure, to control the lying position of said rod and thus control the rolling movements of the two front wheels without having to put his feet on the ground; and c) a step of no roll control, wherein the rod or, if present, the remote command element is not controlled by the driver of the motor vehicle to let the rod follow the rolling movements of the two front wheels without interfering with them.

28. The method according to claim 27, wherein the rod and, if present, the remote command element of the roll control system are parallel to the ground, in the step b) of roll control the driver controlling, and possibly blocking, the roll of the motor vehicle using the rod or the remote command element as a virtual ground support.

* * * * *